United States Patent
Stark

(10) Patent No.: US 9,468,143 B2
(45) Date of Patent: Oct. 18, 2016

(54) GRASS BLADE FOR A TRIMMER

(71) Applicant: Andreas Stihl AG & Co. KG, Waiblingen (DE)

(72) Inventor: Thomas Stark, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 259 days.

(21) Appl. No.: 13/903,036

(22) Filed: May 28, 2013

(65) Prior Publication Data

US 2013/0327198 A1 Dec. 12, 2013

(30) Foreign Application Priority Data

Jun. 12, 2012 (DE) .................. 10 2012 011 465

(51) Int. Cl.
*A01D 34/73* (2006.01)
*B23D 61/02* (2006.01)

(52) U.S. Cl.
CPC ............. *A01D 34/73* (2013.01); *B23D 61/021* (2013.01); *Y10T 83/936* (2015.04); *Y10T 83/9319* (2015.04)

(58) Field of Classification Search
CPC ...... B23D 61/021; B23D 61/025; B23D 61/121; B27B 33/08; Y10T 83/9319–83/9367
USPC .................................................. 83/835–855
See application file for complete search history.

(56) References Cited

U.S. PATENT DOCUMENTS

| | | | | |
|---|---|---|---|---|
| 1,649,864 A | * | 11/1927 | Sherman | .................. B27B 33/02 83/852 |
| 2,117,586 A | * | 5/1938 | Willson | .......................... 83/852 |
| 2,259,015 A | * | 10/1941 | Anderson et al. | .............. 83/852 |
| 2,465,058 A | * | 3/1949 | Burkett | .......................... 83/676 |
| 2,644,494 A | * | 7/1953 | Lundberg | ....................... 83/852 |
| 2,770,267 A | * | 11/1956 | Edmiston | ........................ 83/848 |
| 3,002,541 A | | 10/1961 | Wellauer | |
| 3,374,815 A | * | 3/1968 | Anderson, Jr. et al. | ........ 83/852 |
| 3,866,504 A | * | 2/1975 | Claesson | ................ B27B 33/02 30/355 |
| 4,215,613 A | * | 8/1980 | Anderson | ............ B26D 1/0006 83/676 |
| 4,250,622 A | | 2/1981 | Houle | |
| 5,848,473 A | * | 12/1998 | Brandenburg, Jr. | . B23D 61/121 30/514 |

FOREIGN PATENT DOCUMENTS

| | | |
|---|---|---|
| BE | 499862 | 3/1952 |
| CN | 1640223 A | 7/2005 |
| CN | 2796905 Y | 7/2006 |
| CN | 201702458 U | 1/2011 |
| CN | 202262256 U | 6/2012 |
| EP | 1 219 371 A2 | 7/2002 |
| GB | 522138 * 6/1940 | ........... B23D 61/121 |

* cited by examiner

*Primary Examiner* — Laura M Lee
(74) *Attorney, Agent, or Firm* — Gudrun E. Huckett

(57) ABSTRACT

A cutting blade for a hand-guided trimmer with a drive motor has a disk-shaped base member with cutting teeth disposed about a circumference of the base member. The base member has a first face and a second face opposite the first face. The cutting teeth each have a tooth face edge, the tooth face edge leading in driving direction of the cutting blade and extending radially, and a tooth back edge extending in the circumferential direction. The tooth face edge and the tooth back edge of the cutting teeth are alternatingly ground on the first face or the second face in the circumferential direction and define together a common cutting tip that is leading in the drive direction. Several of the cutting tips of the cutting teeth that are sequentially arranged in the circumferential direction are positioned in a common plane.

12 Claims, 3 Drawing Sheets

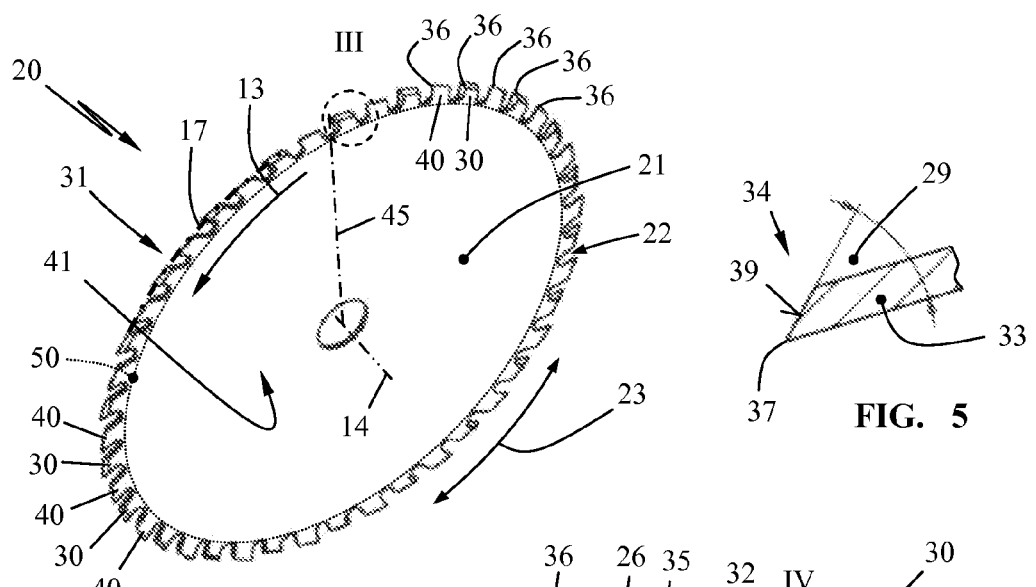
FIG. 2
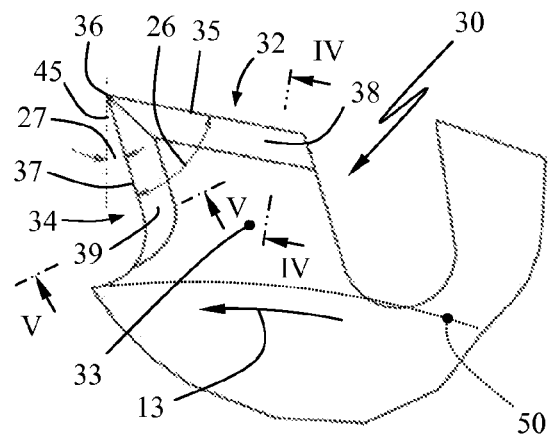
FIG. 3
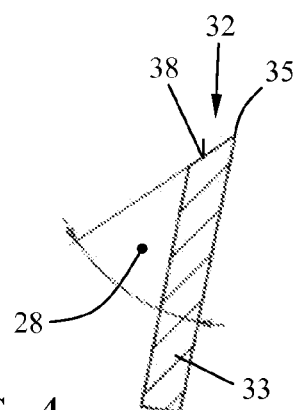
FIG. 4
FIG. 5
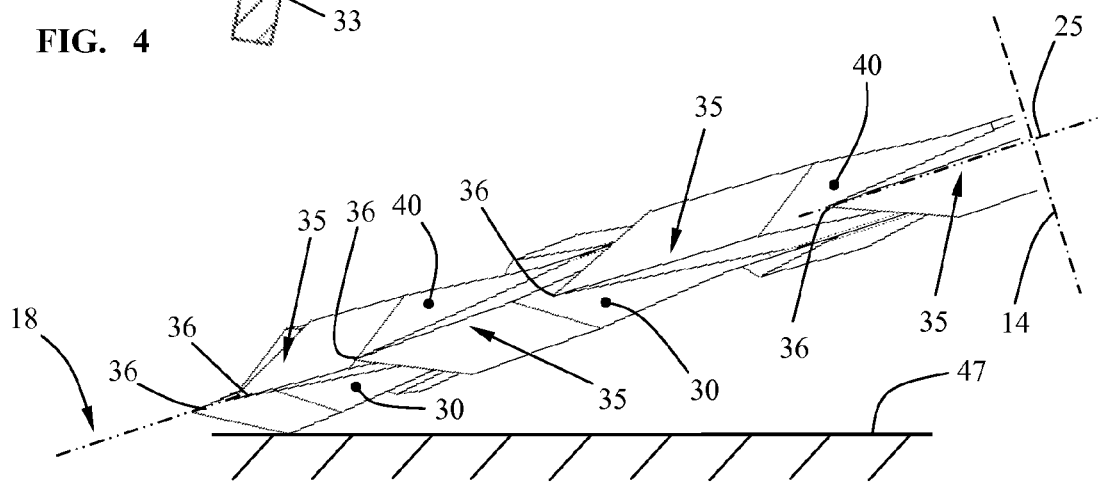
FIG. 6

GRASS BLADE FOR A TRIMMER

BACKGROUND OF THE INVENTION

The invention relates to a cutting blade for a hand-guided trimmer comprising a drive motor. The cutting blade comprises a disk-shaped base member with cutting teeth arranged about its circumference, wherein each cutting tooth comprise a tooth face edge leading in the drive direction and extending approximately radially and further comprise a tooth back edge extending in the circumferential direction. The tooth face edge and the tooth back edge are ground alternatingly from the first face or the second face of the cutting blade so that a cutting edge is formed, respectively, wherein the tooth face edge and the tooth back edge define a common cutting tip that is leading in the drive direction.

Such a cutting blade, referred to also as grass blade, is disclosed in EP 1 219 371 A2. The cutting blade has about its circumference a plurality of cutting teeth wherein each individual cutting tooth has a tooth face edge that is leading in the drive direction and an adjoining tooth back edge extending in the circumferential direction. The tooth face edge and the tooth back edge taper in a wedge shape toward each other and define a cutting lip that is leading in the drive direction. The tooth face edge and the tooth back edge of the sequentially arranged teeth are alternatingly ground from the first face or the second face of the cutting blade.

Such cutting blades are used in trimmers for cutting grass, brush or young trees and shrub.

The tooth face edges that are leading in the drive direction are positioned outside of the center plane of the cutting blade wherein the cutting teeth are alternatingly displaced to the first face or the second face of the cutting blade. In this way, the first set of cutting teeth form with their tooth face edges on the first face of the cutting blade a first cutting circle and the neighboring second set of cutting teeth form with their tooth face edges a second cutting circle on the second face of the cutting blade.

When working with such cutting blades there is the risk that loose material, small stones or the like are engaged by the tooth face edges on the first or the second faces and are thrown off. Moreover, it may happen that, when cutting with the tooth face edges arranged at the top face of the cutting blade, the tooth face edges of the bottom face penetrate into the ground and therefore will cause soil, dust and the like to be swirled up. On the one hand, this leads to a corresponding reaction at the trimmer that must be compensated by the operator and, on the other hand, this causes significant visual impairment because of the swirled-up soil, dust or the like.

SUMMARY OF THE INVENTION

It is an object of the present invention to provide a cutting blade (grass blade) for a trimmer with a drive motor of the aforementioned kind that reduces the risk of collision of the cutting edges with the ground but still provides an excellent cutting performance.

In accordance with the present invention, this is achieved for the cutting blade, or grass blade, in that several cutting tips of the cutting teeth that are sequentially arranged in circumferential direction are positioned in a common plane.

According to the invention, it is thus provided that several cutting tips of the cutting teeth arranged sequentially in the circumferential direction are positioned in a common plane so that the cutting plane of the cutting blade is reduced to a principal plane. Advantageously, all cutting tips of the cutting blade are located in this common plane so that only one single cutting plane is formed in which a collision with the ground, loose material or the like may occur.

Surprisingly, it was found that the arrangement of all cutting tips of the cutting blade in a common plane provides an excellent cutting performance with minimal collision tendency. Since the risk of ground contact of the cutting teeth is also reduced, the cutting blade according to the invention exhibits reduced wear.

Advantageously, the common plane is the center plane of the cutting blade so that upon ground contact substantially the base member of the cutting blade is contacting the ground inasmuch as the cutting blade is moved substantially horizontal to the ground. It has been found that even in a slanted position the collision tendency of the cutting blade with the ground during use is significantly reduced in comparison to cutting blades that form several cutting planes.

An excellent guiding action of the cutting blade is achieved when all cutting tips are positioned on a common cutting circle and/or the tooth back edges extending in the circumferential direction, advantageously all of the tooth back edges, are substantially positioned in the common plane of the cutting tips.

Grinding of the tooth face edge carried out from one face of the cutting blade leads to a surface adjoining the tooth face edge that is advantageously positioned at an angle of approximately 45 degrees relative to the base body of the cutting tooth. Likewise, upon grinding of the tooth back edge a surface results that is positioned expediently also at an angle of approximately 45 degrees relative to the base body of the cutting tooth.

The angle between the cutting edge of the tooth face edge and the cutting edge of the tooth back edge is approximately 50 degrees to 70 degrees. Preferably, the tooth back edge and the tooth face edge taper in a wedge shape toward each other, defining thus the cutting tip, in such a way that the angle is approximately 60 degrees to 65 degrees, in particular 62 degrees.

For an excellent cutting result, the tooth face edge is positioned relative to a radial line through the cutting tip at a rake angle of 15 degrees to 20 degrees, in particular a rake angle of 17 degrees.

For a uniform smooth running of the cutting blade, it is advantageous to bend the cutting teeth, sequentially arranged in the circumferential direction, alternatingly in opposite directions out of the center plane of the cutting blade.

BRIEF DESCRIPTION OF THE DRAWING

Other features of the invention can be taken from the dependent claims, the description and the drawings in which an embodiment of the invention is illustrated that will be explained in detail in the following.

FIG. 2 shows in a perspective view the cutting blade of the trimmer according to FIG. 1.

FIG. 3 is a detail illustration of a cutting tooth according to detail III in FIG. 2.

FIG. 4 is a section of the base body of a cutting tooth along the section line IV-IV of FIG. 3.

FIG. 5 is a section of the base body of a cutting tooth along the section line V-V of FIG. 3.

FIG. 6 is a partial view of the circumference of the cutting blade according to FIG. 2 in a working position relative to the ground.

DESCRIPTION OF THE PREFERRED EMBODIMENTS

Figure 1:
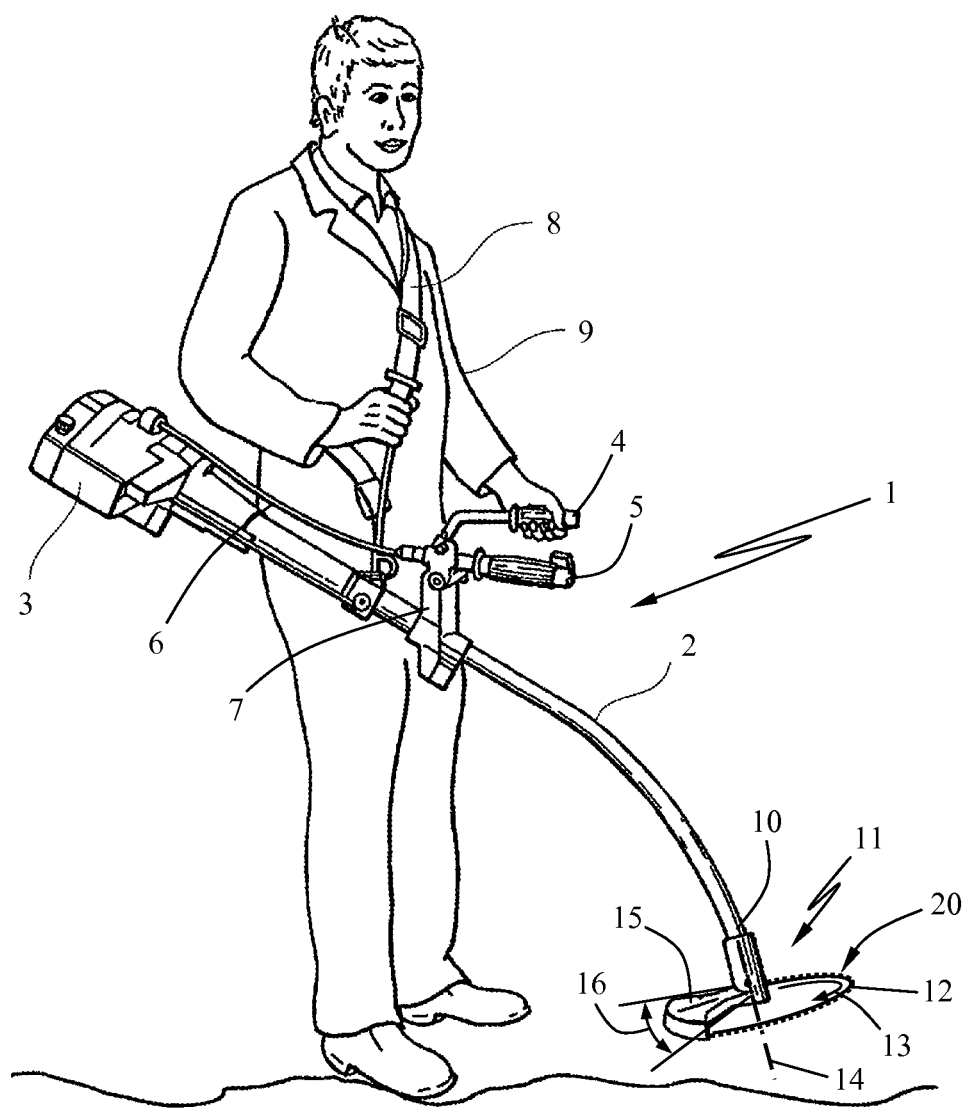
FIG. 1 shows in a schematic illustration a trimmer that is held and guided by an operator.

FIG. 1 shows trimmer 1 comprised substantially of a guide tube 2 that is a bent guide tube in the illustrated embodiment. The bent guide tube 2 can also be designed as an elongate straight guide tube.

On the rearward end of the guide tube 2 a drive motor 3 is provided which can be an internal combustion engine or an electric motor. In the illustrated embodiment, the drive motor 3 is an internal combustion engine that is operated by means of operating elements provided on the handles 4, 5. The operating elements at the handles 4 and 5 are connected, for example, by Bowden cables 6, with the respective actuator on the drive motor 3. The handles 4, 5 are arranged at the ends of a handlebar 7 that extends transversely to the guide tube 2 and is secured thereat. The trimmer 1 is carried by means of a carrying strap 8 by the operator 9 and is guided by acting on the handlebar 7.

At the other end (bottom end) 10 of the guide tube 2, a trimmer head 11 is mounted which in the illustrated embodiment drives a cutting blade 20 that is embodied in particular as a grass blade 12 with which grass, brush and young trees and shrubs can be mowed.

The cutting blade 20 embodied as a grass blade 12 is rotatingly driven in drive direction 13 about axis of rotation 14. At the trimmer head 11, moreover a deflector 15 is arranged as a guard plate which covers the cutting blade about a circumferential angle 16 relative to the operator.

Figure 7:
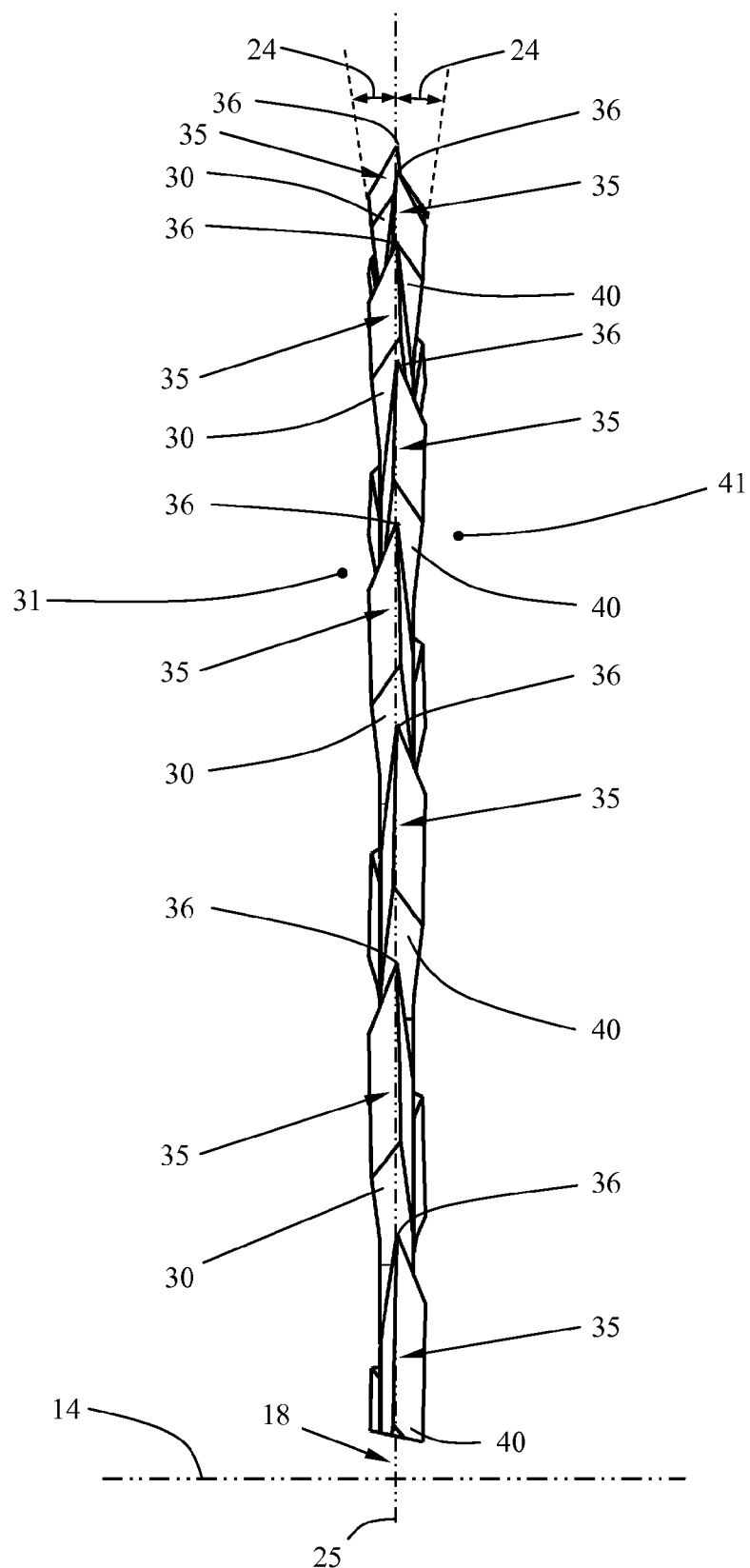
FIG. 7 is a partial view of the circumference of the cutting blade according to FIG. 2.

The cutting blade 20 embodied as a grass blade 12 is perspectively illustrated in FIG. 2 and is comprised substantially of a disk-shaped base member 21 having cutting teeth 30 and 40 arranged on its outer circumference 22. Each cutting tooth, as shown in FIG. 7, is bent by an angle 24 of the same magnitude out of the center plane 25 along a circumferentially extending circular bending line 50 wherein the cutting teeth 30 are bent in the direction the first face 31 of the base member 21 is facing and the cutting teeth 40 are bent in the direction the second face 41 of the base member 21 is facing. The cutting teeth 30 and 40, following each other in the circumferential direction 23 of a cutting blade 20 embodied like a saw blade, are thus bent in different or opposite directions alternatingly out of the center plane 25 of the cutting blade 20.

Each cutting tooth 30, 40 is ground from one of the faces 31, 41 of the cutting blade 20. The cutting teeth 30 that are bent in the direction the first face 31 of the base member 21 is facing are ground from the face 31. The cutting teeth 40 that are neighboring the cutting teeth 30 in the circumferential direction 23 and are bend in the direction the second face 41 of the base member 21 is facing are ground from the face 41. The example of the cutting tooth 30 in FIG. 3 is used to describe the shape, ground surface, and design of the cutting tooth 30. The cutting tooth 40, having a ground surface that is facing in the direction the second face 41 of the base member 21 is facing, is designed likewise.

Each cutting tooth as a base body 33 with a circumferential edge 32 and a radial edge 34 that is leading in the drive direction 13. The cutting tooth 30 is ground from the face 31 at the circumferential edge 32 and the radial edge 34 so that the tooth back edge 35 and the tooth face edge 37 that is leading in the drive direction 13 are formed. The ground surface of the circumferential edge 32 forms a surface 38 and the ground surface of the radial edge 34 forms a surface 39. The two surfaces 38 and 39 extend in a wedge shape toward each other wherein the tooth back edge 35 and the tooth face edge 37 define a cutting tip 36. In the drive direction 13, the cutting tip 36 is leading (is arranged in front of) the tooth face edge 37 as well as the tooth back edge 35.

As shown in FIGS. 4 and 5, the ground surface of the tooth back edge 35 has a surface 38 which is positioned at an angle 28 of approximately 45 degrees relative to the base body 33 of the cutting tooth 30. The ground surface of the tooth face edge 37 forms likewise a surface 39 which is positioned at an angle 29 of approximately 45 degrees relative to the base body 33 of the cutting tooth 30. Other configurations of the angles 28 and 29 can be expedient.

The angle 26 that is formed between the cutting edge of the tooth face edge 37 and the cutting edge of the tooth back edge 35 has a size of approximately 50 degrees to 70 degrees. In the illustrated embodiment, the angle 26 is embodied with a value of approximately 60 degrees to 65 degrees, in particular 62 degrees.

The cutting edge of the tooth face edge 37 is positioned relative to a radial line 45 through the cutting tip 36 at a rake angle 27 of approximately 15 degrees to 20 degrees; in the illustrated embodiment, the rake angle 27 is 17 degrees.

The cutting tip 36 of the cutting teeth 30, 40 are designed such that several cutting tips 36 of the cutting teeth 30, 40 following each other in the circumferential direction 23 are positioned in a common plane 18 (FIGS. 6 and 7). In the illustrated embodiment, all cutting tips 36 of the cutting teeth 30, 40, i.e., all cutting tips 36 of the cutting blade 20, are arranged in a common plane 18. In the illustrated embodiment, the common plane 18 is at the same time the center plane 25 of the cutting blade 20. The arrangement in a further embodiment of the invention can be designed such that moreover all cutting tips 36 are positioned on a common cutting circle 17, as indicated in FIG. 2. In an advantageous embodiment, it is provided additionally that the tooth back edges 35 extending the circumferential direction 23 are substantially positioned in the common plane 18 of the cutting tips 36.

As shown in FIG. 6, the risk of contact of the cutting teeth 30, 40 with the ground 47 is reduced, even for a slanted position of the cutting blade 20. The arrangement of all cutting tips 36 of the cutting blades 20 in a common plane 18 ensures, while providing excellent cutting performance, a reduced collision tendency with the ground 47 or objects lying on the ground, for example, soil clods, stones or the like. Expediently, the common plane 18 is the center plane 25 of the cutting blade 20 so that upon contact with the ground 47 substantially the base member 21 of the cutting blade 20 or the base body 33 of the cutting teeth 30, 40 is contacting the ground, as schematically indicated in FIG. 6. Even in the slanted position illustrated in FIG. 6 of the cutting blade 20 relative to the ground 47, the collision tendency of the cutting tips 36 with the ground 47 is significantly reduced in comparison to known cutting blades that have several cutting planes positioned at a spacing to the center plane. In this way, wear of the cutting blade 20 according to the invention or of its cutting teeth 30, 40 is significantly reduced so that the cutting blade 20 according to the invention reaches a significantly higher service life (longer operating time).

The specification incorporates by reference the entire disclosure of German priority document 10 2012 011 465.6 having a filing date of Jun. 12, 2012.

While specific embodiments of the invention have been shown and described in detail to illustrate the inventive principles, it will be understood that the invention may be embodied otherwise without departing from such principles.

What is claimed is:

1. A cutting blade for a hand-guided trimmer with a drive motor, the cutting blade comprising:
    a disk-shaped base member with first cutting teeth and second cutting teeth that are disposed about a circumference of the base member and sequentially arranged in the circumferential direction such that the first cutting teeth and the second cutting teeth alternate in the circumferential direction;
    the base member having a first face and a second face opposite the first face;
    the first and second cutting teeth each comprising a base body, a tooth face edge, the tooth face edge leading in a driving direction of the cutting blade and extending approximately radially, and further comprising a tooth back edge extending in a circumferential direction of the base member;
    wherein the tooth face edge and the tooth back edge of the first cutting teeth each are ground only on the first face and wherein the tooth face edge and the tooth back edge of the first cutting teeth define together a common first cutting tip, respectively, wherein the first cutting tip is leading in the drive direction;
    wherein the tooth face edge and the tooth back edge of the second cutting teeth each are ground only on the second face and wherein the tooth face edge and the tooth back edge of the second cutting teeth define together a common second cutting tip, respectively, wherein the second cutting tip is leading in the drive direction;
    wherein all of the first and second cutting tips of the first and second cutting teeth of the cutting blade are positioned in a common plane.

2. The cutting blade according to claim 1, wherein said common plane is a center plane of the cutting blade.

3. The cutting blade according to claim 1, wherein all of the first and second cutting tips are positioned on a common cutting circle.

4. The cutting blade according to claim 1, wherein the tooth back edges of the first and second cutting teeth are substantially positioned in said common plane of the cutting tips.

5. The cutting blade according to claim 1, wherein a ground surface of the tooth face edge of the first and second cutting teeth forms a surface positioned at an angle of 45 degrees relative to the base body, respectively.

6. The cutting blade according to claim 1, wherein a ground surface of the tooth back edge of the first and second cutting teeth forms a surface positioned at an angle of 45 degrees to the base body, respectively.

7. The cutting blade according to claim 1, wherein the angle defined between a cutting edge of the tooth face edge and a cutting edge of the tooth back edge of the first and second cutting teeth, respectively, is 50 degrees to 70 degrees.

8. The cutting blade according to claim 7, wherein the angle is 60 degrees to 65 degrees.

9. The cutting blade according to claim 8, wherein the angle is 62 degrees.

10. The cutting blade according to claim 1, wherein the tooth face edge of the first and cutting teeth is positioned at a first rake angle of 15 degrees to 20 degrees relative to a radial line of the base member extending through the first cutting tip or the second cutting tip, respectively.

11. The cutting blade according to claim 10, wherein the rake angle is 17 degrees.

12. A cutting blade for a hand-guided trimmer with a drive motor, the cutting blade comprising:
    a disk-shaped base member with cutting teeth that are disposed about a circumference of the base member and sequentially arranged in the circumferential direction;
    the base member having a first face and a second face opposite the first face;
    the cutting teeth each comprising a tooth face edge, the tooth face edge leading in a driving direction of the cutting blade and extending approximately radially, and further comprising a tooth back edge extending in a circumferential direction of the base member, wherein the tooth face edge and the tooth back edge of the cutting teeth are alternatingly ground on the first face or the second face in the circumferential direction and the tooth face edge and the tooth back edge define together a common cutting tip, respectively, wherein the cutting tip is leading in the drive direction;
    wherein all of the cutting tips of the cutting teeth of the cutting blade are positioned in a common plane;
    wherein the cutting teeth sequentially arranged in the circumferential direction are alternatingly bent in opposite directions out of a center plane of the cutting blade.

* * * * *